(12) United States Patent
Niehues et al.

(10) Patent No.: US 8,466,315 B2
(45) Date of Patent: Jun. 18, 2013

(54) UREA GRANULATION PROCESS WITH AN ACIDIC SCRUBBING SYSTEM AND THE SUBSEQUENT INTEGRATION OF AMMONIUM SALT INTO UREA GRANULES

(75) Inventors: Paul Niehues, Dortmund (DE); Harald Franzrahe, Dortmund (DE); Matthias Potthoff, Dortmund (DE); Roland Monstrey, Assenede (BE)

(73) Assignee: UHDE Fertilizer Technology B.V., Roermond (NL)

( * ) Notice: Subject to any disclaimer, the term of this patent is extended or adjusted under 35 U.S.C. 154(b) by 0 days.

(21) Appl. No.: 12/998,733

(22) PCT Filed: Nov. 6, 2009

(86) PCT No.: PCT/EP2009/007953
§ 371 (c)(1),
(2), (4) Date: May 25, 2011

(87) PCT Pub. No.: WO2010/060535
PCT Pub. Date: Jun. 3, 2010

(65) Prior Publication Data
US 2011/0229394 A1 Sep. 22, 2011

(30) Foreign Application Priority Data
Nov. 28, 2008 (EP) .................................... 08020708

(51) Int. Cl.
*B01D 53/58* (2006.01)
*B01J 19/00* (2006.01)
*C07C 273/00* (2006.01)

(52) U.S. Cl.
USPC .............................. 564/32; 423/238; 422/187

(58) Field of Classification Search
USPC ................................. 423/238; 422/187; 564/32
See application file for complete search history.

(56) References Cited

U.S. PATENT DOCUMENTS

| | | | |
|---|---|---|---|
| 3,798,021 A | 3/1974 | Bress et al. | |
| 4,370,198 A | 1/1983 | Dencs et al. | |
| 4,493,820 A | 1/1985 | Clausen | |
| 4,662,929 A | 5/1987 | Lammi | |
| 5,779,945 A | 7/1998 | Nijsten et al. | |
| 2011/0229394 A1* | 9/2011 | Niehues et al. | 423/238 |

FOREIGN PATENT DOCUMENTS

| | | |
|---|---|---|
| EP | 0 514 902 A1 | 11/1992 |
| EP | 0 853 971 A1 | 7/1998 |
| GB | 2 162 163 A | 1/1986 |
| WO | WO 03/099721 A1 | 12/2003 |

OTHER PUBLICATIONS

Uhde: "Urea", Brochure Urea, URL: http: //www.uhde.eu/cgi-bin/byteserver.pl/archive/upload/ uhde_brochures_pdf_en_2.00.pdf, Dec. 2007, pp. 1-24, XP-002525995.
Potthoff, M., "Innovative ammonia emission reductions", URL: http://www.uhde-fertilizer-technology.com/fileadmin/Userfiles/2008-Jul-Aug_nitrogen_syngas.pdf, pp. 39-41, Jul.-Aug. 2008, XP002525996.

* cited by examiner

*Primary Examiner* — Timothy Vanoy
(74) *Attorney, Agent, or Firm* — Marshall & Melhorn, LLC

(57) ABSTRACT

A urea granulation process and the apparatus suitable for operating that process integrates a method for reducing ammonia emissions from a urea granulation plant which is emitted by a urea production process by scrubbing the off-gas and recovering the scrubber bleed and integrating it into the granulation process so that ammonium salts are completely contained by the process.

19 Claims, 1 Drawing Sheet

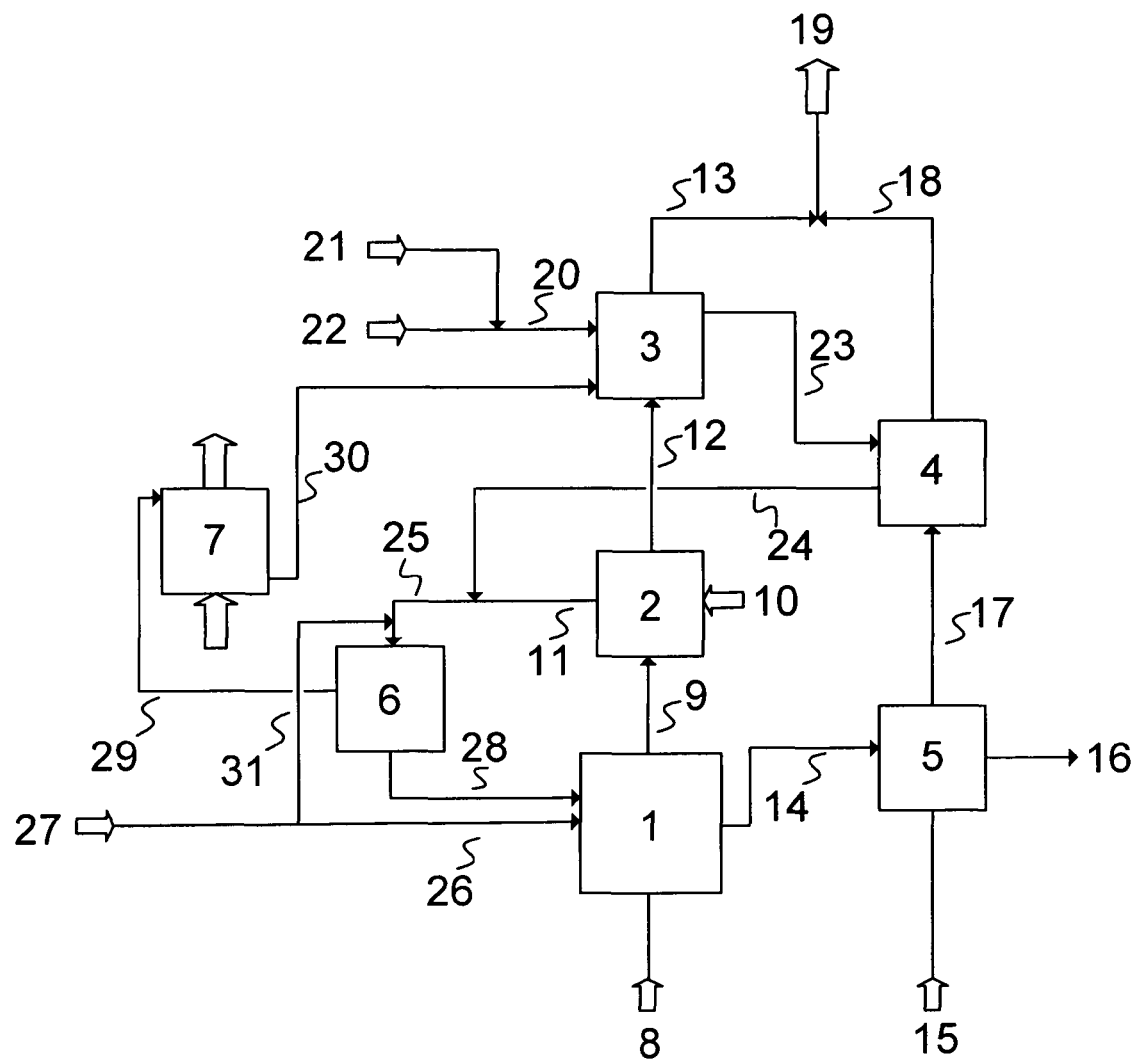

UREA GRANULATION PROCESS WITH AN ACIDIC SCRUBBING SYSTEM AND THE SUBSEQUENT INTEGRATION OF AMMONIUM SALT INTO UREA GRANULES

BACKGROUND OF THE INVENTION

The invention relates to a urea granulation process and to the apparatus suitable for operating that process. The invention integrates a method for reducing ammonia emissions from a urea granulation plant which is currently emitted by a conventional urea production process by scrubbing the off-gas and recovering the scrubber bleed and integrating it into the granulation process so that ammonium salts are completely contained by the process.

A common process for producing granules from a liquid composition is described in U.S. Pat. No. 5,779,945. The focus of this patent is the treatment and sorting of generated granules with different sizes. Herein a gas/solids separating apparatus such as a cyclone or a scrubber is used to separate solid material from the off-gas stream of the apparatus. Advanced treatment of the off-gas stream is not taken into further account.

In U.S. Pat. No. 4,370,198 the off-gas of the granulation unit is sent to a dust separation cyclone followed by a continuous wet scrubber which both contributes to the scrubbing off said off-gas stream. The scrubbing liquid used is part of the solution or suspension to be proceeded and the scrubbing liquid leaving the wet scrubber is fed back directly into the granulation unit. Exemplarily, the described process can be achieved for the production of sodium chloride, urea, saccharose or ferric oxide, respectively. Hereby the scrubbing liquor is part of the solution or suspension to be processed and is send directly back into the granulation unit. This process can be only achieved for dust scrubbing but is not suitable for ammonia scrubbing.

A further example for an apparatus and a method for wet type simultaneous cleaning and dust-removing gas treatment in a horizontal cross-flow scrubber are disclosed in EP 0853971 A1. This invention performs the removal of pollutants and dust in a packed tower.

In a urea plant used air exiting a urea granulator that is equipped with a fluidized bed contains in addition to urea dust also ammonia. This ammonia contamination needs to be removed before the off-gas stream can be vented into the atmosphere.

Removing ammonia from an off-gas stream is a well-known technology. Usually the off-gas stream is treated with an acidic scrubbing solution. This scrubbing solution can be easily manufactured by adding an acid such as nitric acid or sulphuric acid to water. The ammonia is removed from the gas stream by chemical absorption and converted to the corresponding ammonium salt. The use of nitric acid produces ammonium nitrate (AN), and the use of sulphuric acid produces ammonium sulphate (AS) respectively. These ammonium salt-containing solutions can be used for the production of ammonium sulphate fertilizer or NPK fertilizer, the technology for this is state of the art.

In a urea plant, ammonium salts do not occur in the process and cannot easily be processed at existing urea facilities. A conventional urea production facility therefore has only the following options to reduce gaseous ammonia emissions from the granulation plant:

to discharge the diluted ammonium salt solution to a waste water stream, to concentrate the diluted ammonium salt solution up to a concentration which can be utilized by other plants, e.g. NPK, to produce UAS (urea/ammonium sulphate) fertilizer with a high sulphur content, to produce UAN (urea/ammonium nitrate) solution.

All of these alternatives require significant investments and changes to operating conditions or entail changes of the product composition and characteristics. All above options result in new products that require additional facilities for transport and handling as well as energy utilities in expensive quantities. As a consequence, nowadays, urea facilities are run without efficient ammonia removal causing severe environmental problems. Therefore, ammonia removal from a urea facility is a challenging task that needs to be solved.

An alternative solution is described in WO 03/099721. This invention relates to a process for removing ammonia from an ammonia-containing gas stream by converting the ammonia in the ammonia-containing gas stream with an organic acid into an ammonium salt, whereas the obtained ammonium salt is contacted, at elevated temperature, with peroxide. The ammonium salt is hereby converted into a $NH_3$, $CO_2$ and $H_2O$ containing mixture in a decomposer and can readily be reprocessed in a urea synthesis unit. The peroxide is supplementary to the common process and may relate to other negative accompaniments. Also, for the conversion of the ammonium salt into $NH_3$, $CO_2$ and $H_2O$ a separate decomposer in addition to the normal plant layout is required. This emerging gas stream can not be reprocessed in a granulation unit but needs to be recycled in a urea synthesis unit.

Reductions of ammonia emissions are also described in M Potthoff, Nitrogen+Syngas, [online], July-August 2008, pages 39-41. In FIG. 1 a combined dust and acidic scrubber system is shown. The ammonia is absorbed in the acidic scrubbing section and converted into ammonium sulphate. The ammonium sulphate solution is added to the recycle flow going back to the evaporation section. In this unit it is mixed with urea melt from the urea synthesis unit. The concentrated liquor stream from the evaporation is conveyed into the urea granulator. The condensate coming out of the evaporation unit is utilised as makeup for the combined dust/ammonia scrubbing system. With this so called Ammonia Convert Technology ammonia in off-gas can be reduced to 30 $mg/Nm^3$. The technology without acidic scrubbing as shown in Brochure Urea, [online], December 2007, pages 1-24 reduces ammonia in off-gas only to values of around 160 $mg/m^3$ and is further referred herein as technology state of the art.

BRIEF SUMMARY OF THE INVENTION

The ammonia convert technology described in M Potthoff, Nitrogen+Syngas, [online], July-August 2008, pages 39-41 implicates still several disadvantages. First of all, the water balance in this system is a critical parameter. If disturbed, urea synthesis will be contaminated with ammonium sulphate or alternatively large amounts of waste water need to be treated. In addition, mixing of acidic solution with concentrated urea melt in the evaporation unit has adverse effects on granulation. Moreover, this technology implicates the generation of large amounts of condensate contaminated with ammonium sulphate that needs to be distributed to various scrubbers, including dust and acidic scrubbing technology. Also the remaining ammonia concentration in the off-gas achieved with this technology is still not sufficient or satisfactory for modern urea granulation plants.

The object of the invention therefore is to provide a process which integrates and optimizes existing scrubbing technology of off-gas generated by the urea granulation process without the production of by-products or waste streams. The process should prevent problems related to conventional technologies as described above. Especially contaminations of the urea melt from a urea synthesis unit should be excluded. The process should not use any additional expensive facilities. In addition the process should not use utilities in expensive quantities such as peroxide. Altogether the process should be more environmental friendly than common urea granulation processes state of the art by finding a use for the ammonium salts generated by the common ammonia scrubbing process. It is also the object of the invention to provide the apparatus suitable to operate such a process.

This is achieved by a urea granulation process with scrubbing system including several waste streams for removal of dust and ammonia from the off-gas of a urea granulation unit comprising a urea granulator 1, a granulator scrubber dust stage 2, a granulator scrubber acid stage 3, product coolers 5, a product cooler scrubber dust stage 4, an evaporation unit 6, and a condenser unit 7. Thereby a first stream of fresh air 8, running through a first sequence of process steps, is send into the urea granulator 1, whereby dust- and ammonia-laden air 9 is drawn off from the granulator 1 and conveyed into a granulator scrubber dust stage 2, followed by a granulator scrubber acid stage 3, in which stage the ammonia-laden air 12 is contacted with an acid in liquid 22 phase and ammonia is scrubbed from that air by the generation of an ammonium salt. A second stream of fresh air 15, running through a second sequence of process steps, is used for cooling the product drawn off from the urea granulator 1, whereby said cooling is performed in product coolers 5, thereby said air is heated up, and afterwards is conveyed to a product cooler scrubber dust stage 4. The clean off-gas 13 drawn off from the granulator scrubber acid stage 3, and the clean off-gas 18 drawn off from the product cooler scrubber dust stage 4, are released into the atmosphere 19. Hereby the scrubbing system is passed, which in itself is a complete closed system of waste streams. In this process the ammonium salt solution stream 23 from the granulator scrubber acid stage 3, is fed into said product cooler scrubber dust stage 4, whereby the ammonia of the dust-laden air stream 17 exiting the product coolers 5 is removed, and the released liquor 24 from the product cooler scrubber dust stage 4 and the released liquor 11 from the granulator scrubber dust stage 2 is send to the evaporation unit 6. The vapour stream 29 from the evaporation unit 6, which contains ammonia is given into the condenser unit 7, which releases a liquid process condensate 30, and said liquid process condensate 30 is given into the granulator scrubber acid stage 3, and the concentrated liquor stream 28 from the evaporation unit 6, containing urea and ammonium salt, and a urea melt 26 from a synthesis unit 27 are conveyed into the urea granulator 1, separately. Thereby the ammonium salt contained in the concentrated liquor stream 28 is integrated into the granulated urea product.

Hereby the scrubbing system in itself is a complete closed system, and therefore totally decoupled from urea synthesis. Thereby contaminations of the urea melt are avoided.

The salt concentration of the scrubbing liquor in the product cooler scrubber dust stage 4 included in the second sequence of process steps is 35-60% wt.

Further options of the invention are related to the concentration of the urea melt 26 and concentrated liquor stream 28, containing urea and ammonium salt, for the urea granulator 1 that is kept in a range from 95 to 99.8% wt. Preferably, it is kept in a range from 96 to 97.5% wt.

A further embodiment is that the acid 22 is selected from the group consisting of sulphuric acid, nitric acid, phosphoric acid, citric acid, lactic acid and oxalic acid. Of course, other acids can be used if they are non-volatile. Preferably, sulphuric acid is used, as it is readily available and in addition, it supplies sulphur which is considered to be a highly demanded nutrient.

The concentration of the ammonia salt in the reaction liquor in the granulator scrubber acid stage 3, included in the first sequence of process steps, is kept <10% wt, and preferably is kept in a range from 6-8% wt. Thereby, the pH of the liquor stream in the granulator scrubber acid stage 3 included in the first sequence of process steps, is kept in a range from 2-6, and preferably is kept in a range from 3.5-5.0, and most preferably is kept in a range from 4.0-4.5.

The urea concentration of the reaction liquor in the granulator scrubber dust stage 2 included in the first sequence of process steps is kept in a range from 35 to 60% wt. It is preferable to keep the urea concentration of the liquor in the granulator scrubber dust stage 2 included in the first sequence of process steps, in a range from 45 to 55% wt.

Furthermore, the concentration of the ammonium salt at the outlet of the evaporation unit 6 is kept at weight percentage of below 12% wt, and it is preferably kept in a range from 9-11% wt.

Optionally, the mixture fed into the evaporation unit 6 is mixed with a portion of urea melt 31.

Furthermore, the mixture of clean off-gases released into the atmosphere 19 exhibits a concentration of $NH_3$ in the range of 10-25 $mg/Nm^3$, and preferably exhibits a concentration of $NH_3$ being <15 $mg/Nm^3$.

The described urea granulation process with a scrubbing system including several waste streams for the removal of dust and ammonia from off-gas of a urea granulator is to be operated in an apparatus comprising an urea granulator 1, a granulator scrubber dust stage 2, and a granulator scrubber acid stage 3, forming a first sequence of apparatuses. Also included are product coolers 5, and a product cooler scrubber dust stage 4, forming a second sequence of apparatuses, an evaporation unit 6, a condenser unit 7, a means for providing the urea granulator with fresh air 8, a means for drawing off dust- and ammonia-laden air 9 from the urea granulator 1 and for conveying it into the granulator scrubber dust stage 2, a means for drawing off air 12 from the granulator scrubber dust stage 2 into the granulator scrubber acid stage 3, a means for providing the product coolers 5 with fresh air 15, a means for conveying the used air 17 from the product coolers 5 to the product cooler scrubber dust stage 4, a means for releasing the cleaned air 18 from the product cooler scrubber dust stage 4 and the cleaned air 13 from the granulator scrubber acid stage 3, included in the first sequence of apparatuses, into the atmosphere 19, a means for conveying process water 21 and acid 22 to the granulator scrubber acid stage 3, a means for conveying process water 10 to the granulator scrubber dust stage 2, a means for conveying the urea granules 14 from the urea granulator 1 to the product coolers 5. Thereby apparatuses of the scrubbing system are connected in such a way that a complete closed system of waste streams is built, comprising a means for conveying the liquor stream 23 from the granulator scrubber acid stage 3 to the product cooler scrubber dust stage 4, and means for conveying the liquor stream 24 from the product cooler scrubber dust stage 4 and the liquor stream 11 from the granulator scrubber dust stage 2 to the evaporation unit 6, a means for conveying the steam vapour 29 of the evaporation unit 6 to a condenser unit 7, a means for conveying the process condensate 30 from the condenser unit 7 to the granulator scrubber acid stage 3, and means for conveying urea melt 26 and a concentrated liquor stream 28, containing urea and ammonium salt, separately from each other into the urea granulator 1.

An additional embodiment of the invention is that the apparatus comprises a means for mixing the liquor stream 24 from the product cooler scrubber dust stage 4, included in the second sequence of apparatuses, with the liquor stream 11 from the granulator scrubber dust stage 2 included in the first sequence of apparatuses, a means for feeding urea melt 31 to that mixture, and a means for feeding that mixture into the evaporator 6.

A further option of the apparatus is that it comprises a means for feeding urea melt to the evaporation unit 6.

BRIEF DESCRIPTION OF THE DRAWING

The figure shows a block diagram of the urea granulation process according to the invention.

In the following, the invention is described in more detail by way of example.

FIG. 1 shows a block diagram with a urea granulator with a fluidized bed 1, a granulator scrubber dust stage 2, and a granulator scrubber acid stage 3, forming a first sequence of apparatuses, product coolers 5, and a product cooler scrubber dust stage 4, forming a second sequence of apparatuses, an evaporation unit 6, a condenser unit 7, and the main process streams. The urea granulator can be a drum granulator instead of a granulator with a fluidized bed or any other granulator, which uses fresh air.

DETAILED DESCRIPTION OF THE INVENTION

The urea granulator 1 is supplied with a concentrated liquor stream containing urea and ammonium salt 28 drawn off from the evaporator 6 as well with urea melt 26, separately from each other. In the urea granulator 1 urea granules are formed in the fluidized bed, which is fluidized and cooled by a fresh air stream 8. A stream of dust- and ammonia-laden air 9 is drawn off. It is first scrubbed in the granulator scrubber dust stage 2, included in the first stream of apparatuses, where urea dust is removed. A stream of process water 10 is added to the granulator scrubber dust stage 2 and the bleed stream 11 is send to the evaporation unit 6. Thereby the air is cooled down by evaporation of water in the scrubber. The almost dust-free, but ammonia-laden air stream 12 is scrubbed in the granulator scrubber acid stage 3, included in the first sequence of apparatuses where ammonia is removed, and the clean off-gas stream 13 can be drawn off.

The urea granules produced 14 are conveyed to the product coolers 5 where a fresh air stream 15 cools the final product 16. The dust-laden air stream 17 is conveyed to the product cooler scrubber dust stage 4, included in the second sequence of apparatuses, where the urea dust is washed out while the air is cooled down by evaporation of water in the scrubber. The clean air stream 18 leaving the product cooler scrubber dust stage 4 is mixed with the clean off-gas stream 13 and is released to the atmosphere 19.

The scrubbing solution for the granulator scrubber acid stage 3, included in the first sequence of apparatuses, consists of process water 21 and the acid stream 22 and process condensate 30. In the granulator scrubber acid stage 3 the acid solution reacts with ammonia producing an ammonium salt solution stream 23, which is conveyed to the product cooler scrubber dust stage 4, included in the second sequence of apparatuses, whereby the ammonia of the dust-laden air stream 17 exiting the product coolers 5 included in the second sequence of process steps, is removed. This solution entrains the urea dust from the dust-laden air stream 17.

The resulting liquor stream 24 from the product cooler scrubber dust stage, included in the second sequence of process steps, is combined with the bleed stream 11 from the granulator scrubber dust stage 2 and the resulting mixture 25 is conveyed to the evaporation unit 6, where it is concentrated. The concentrated liquor stream 28 from the evaporation unit 6 is fed to the urea granulator 1 to integrate the generated ammonium salt into the granulation process. A portion of the urea melt 31 can be added to the evaporation unit 6, in order to keep the urea concentration and the ammonium sulphate concentration of the concentrated liquor stream 28 in the right ratio, but the urea melt stream 31 is preferred to be reduced to a minimum. The steam vapour 29 drawn off from the evaporation unit 6 is conveyed to a condenser unit 7, where it is cooled by external cooling water. The process condensate 30 generated during the condensation is send into the granulator scrubber acid stage 3. For example, as a preferred embodiment horizontal-type cross-flow scrubber are used.

Therefore a closed circle of waste streams is formed and all waste streams are recycled. In addition the generated ammonium salts are integrated in the urea granulation process. Also external process water consumption is reduced to a minimum. Altogether, this combination is characterized by its environmental compatibility.

In contrast to the ammonia convert technology described in M Potthoff, Nitrogen+Syngas, [online], July-August 2008, pages 39-41, the technology of the current invention avoids contamination of the urea melt generated in the urea synthesis unit 27 by building a closed scrubbing system. This is achieved by conveying the concentrated liquor stream 28 from the evaporation unit 6 and the urea melt 26 in separate means to the granulator 1. Via stream 31 only a defined and controllable amount of urea melt from the synthesis unit 27 is fed into the evaporation unit 6.

In example 1 a table is shown giving some typical figures concerning ammonia in the urea granulation processes state of the art:

The amount of ammonia of 500 to 600 ppm by weight in the feed to the granulation unit is more or less unavoidable as it is the result of the equilibrium formed in the upstream evaporation section. About 90 ppm ammonia are added through biuret formation in the urea solution line, so that in total about 590 to 690 ppm enter the granulator.

About 50 ppm of this ammonia are included in the final product, whereby the rest leaves the granulation plant with the air flow from the granulation unit via stacks. This results in a final concentration of approximately 130 to 160 mg/Nm$^3$ for the technology state of the art as presented in Brochure Urea, [online], December 2007, pages 1-24. A final concentration of approximately 30 mg/Nm$^3$ ammonia is found in a combined stack of the so called ammonia convert technology as described in M Potthoff, Nitrogen+Syngas, [online], July-August 2008, pages 39-41, while the inventive technology described in this application leads to ammonia concentrations of 10 mg/Nm$^3$. Therefore a drastically improvement can be achieved using this technology.

|  | technology state of the art (Brochure Urea, 2007) | ammonia convert technology (Potthoff, 2008) | inventive technology |
|---|---|---|---|
| Free ammonia from evaporation section |  | ≈500 to 600 ppm wt. |  |
| Ammonia from biuret formation |  | ≈90 ppm wt. |  |
| Total free ammonia at granulator inlet |  | ≈590 to 690 ppm wt. |  |
| Free ammonia in final product |  | ≈50 ppm wt. |  |
| Free ammonia released (based on urea solution) |  | ≈540 to 640 ppm wt. |  |
| Typical ammonia concentration in combined stack | ≈130 to 160 mg/Nm³ ≅0.6 to 0.7 kg/ton$_{product}$ | ≈30 mg/Nm³ ≅0.14 kg/ton$_{product}$ | ≈10 mg/Nm³ ≅0.05 kg/ton$_{product}$ |

Example 2 shows advantageous economical aspects of the ammonia convert technology forming the basis of the current invention in comparison to the so called ammonia convert technology as described in M Potthoff, Nitrogen+Syngas, [online], July-August 2008, pages 39-41 and technology state of the art as presented in Brochure Urea, [online], December 2007, pages 1-24:

For calculations prices for ammonia of about 300 US$/mt, for urea of about 250 US$/mt, and for sulphuric acid of about 20 US$/mt are predicted.

|  | technology state of the art, (Brochure Urea, 2007) | ammonia convert technology (Potthoff, 2008) | inventive technology |
|---|---|---|---|
| Plant capacity: | 3,500 mt/d | 3,500 mt/d | 3,500 mt/d |
| ammonia emissions: (600 ppm NH₃ in urea solution) | ≈100 kg/hr | 20 kg/hr | 7 kg/hr |
| Annual ammonia loss: | ≈800 mt/a | 160 mt/a | 60 mt/a |
| Efficiency of ammonia recovery: |  | 80% | 93% |

An annual ammonia loss of 800 mt/a means in total a minus of 240,000 US$ per year in common urea granulation plants state of the art.

| technology state of the art (Brochure Urea, 2007) | |
|---|---|
| Recovered ammonia | ≈no recovery |
| Ammonium sulphate produced | ≈0 mt/a |
| Sulphuric acid consumption | ≈0 mt/a −0 US$/a |

Using the ammonia convert technology a recovery of about 640 mt/a is possible, which is a value of about 192,000 US$. Approximately 2,500 mt/a ammonium sulphate is produced by a plant having the same capacity as the one used for calculations for the technology state of the art. The additional urea production is about 2,500 mt/a leading to a profit of about 625,000 US$ per year. Considering the costs of the sulphuric acid consumption of such a process of 1,900 mt/a, what accounts for costs of about 38,000 US$ per year, a total saving of about 587,000 US$ per year remains.

| ammonia convert technology (Potthoff, 2008) | | |
|---|---|---|
| Recovered ammonia | ≈640 mt/a (value of 192,000 US$) | |
| Ammonium sulphate produced | ≈2,500 mt/a | |
| Sulphuric acid consumption | ≈1,900 mt/a | −38,000 US$/a |
| Replacement/additional urea production | ≈2,500 mt/a | +625,000 US$/a |
| Annual saving benefit | | +587,000 US$/a |

Using the current invention a recovery of ammonia of about 740 mt/a is possible, which is a value of about 222,000 US$. Approximately 2,900 mt/a ammonium sulphate is produced by a plant having the same capacity as the one used for calculations for the technology state of the art. The additional urea production is about 2,900 mt/a leading to a profit of about 725,000 US$ per year. Considering the costs of the sulphuric acid consumption of such a process of 2,200 mt/a, what accounts for costs of about 44,000 US$ per year, a total saving of about 681,000 US$ per year remains.

| inventive technology | | |
|---|---|---|
| Recovered ammonia | ≈ 740 mt/a (value of 222,000 US$) | |
| Ammonium sulphate produced | ≈ 2,900 mt/a | |
| Sulphuric acid consumption | ≈ 2200 mt/a | −44,000 US$/a |
| Replacement/additional urea production | ≈ 2,900 mt/a | +725,000 US$/a |
| Annual saving benefit | | +681,000 US$/a |

Therefore the inventive technology leads to savings of about 94,000 US$ per year compared to the ammonia convert technology as described in M Potthoff, Nitrogen+Syngas, [online], July-August 2008, pages 39-41. This effect is due to the increased amount of recovered ammonia that accounts for 400 mt/a additional urea production compared to the ammonia convert technology.

Thus, a solution is produced which contains a low ammonium salt concentration and a high urea concentration. There is no significant change to the product specification and quality by the addition of these small amounts of ammonium salts. The N content of the urea product stays above 46% N, so that the product is still a typical urea fertilizer.

The advantages of the proposed process are:

Significantly lower ammonia emissions to the environment.

Cost benefits are achieved by reducing the ammonia losses and thereby increasing the fertilizer production.

A simple way is used to process ammonium salts in existing urea granulation plants.

Closed loop system with no recycle to synthesis or discharge to waste water system thereby avoiding contaminations with ammonium sulphate.

A proven and low-cost technical process is used to remove ammonia from the off-gas streams from the urea granulation plant with fluidized bed granulation.

As the recovered ammonia is included in the product the urea production is increased, leading to a significant economic benefit.

A typical urea fertilizer grade product is produced.

| | Key to referenced items |
|---|---|
| 1 | urea granulator |
| 2 | granulator scrubber dust stage |
| 3 | granulator scrubber acid stage |
| 4 | product cooler scrubber dust stage |
| 5 | product coolers |
| 6 | evaporation unit |
| 7 | condenser unit |
| 8 | fresh air stream |
| 9 | dust- and ammonia-laden air |
| 10 | stream of process water |
| 11 | liquor stream |
| 12 | ammonia-laden air stream |
| 13 | clean off-gas stream |
| 14 | urea granules |
| 15 | fresh air stream |
| 16 | final product |
| 17 | dust-laden air stream |
| 18 | clean air stream |
| 19 | atmosphere |
| 20 | acidic feed |
| 21 | process water |
| 22 | acid stream |
| 23 | ammonium salt solution stream |
| 24 | liquor stream |
| 25 | resulting mixture |
| 26 | urea melt |
| 27 | urea melt from synthesis unit |
| 28 | concentrated liquor stream |
| 29 | steam vapour |
| 30 | process condensate |
| 31 | portion of urea melt |

The invention claimed is:

1. A urea granulation process with scrubbing system including several waste streams for removal of dust and ammonia from the off-gas of a urea granulation unit which comprises:
    a urea granulator;
    a granulator scrubber dust stage;
    a granulator scrubber acid stage;
    product coolers;
    a product cooler scrubber dust stage;
    an evaporation unit; and
    a condenser unit;
    the process comprising:
    sending a first stream of fresh air, running through a first sequence of process steps, into the urea granulator; whereby
       drawing off dust- and ammonia-laden air from the granulator and conveying it into a granulator scrubber dust stage followed by a granulator scrubber acid stage, in which scrubber acid stage the ammonia-laden air is contacted with an acid in liquid phase and ammonia is scrubbed from that air by the generation of an ammonium salt;
    sending a second stream of fresh air through a second sequence of process steps, to cool the product drawn off from the urea granulator; whereby
       the cooling is performed in product coolers;
       the air is heated and afterwards conveyed to a product cooler scrubber dust stage;
    drawing clean off-gas from the granulator scrubber acid stage and drawing clean off-gas from the product cooler scrubber dust stage, and releasing the clean off-gas into the atmosphere; wherein
    the scrubbing system is a complete closed system, whereby:
    ammonium salt solution stream from the granulator scrubber acid stage is fed into the product cooler scrubber dust stage, whereby the ammonia of the dust-laden air stream exiting the product coolers is removed;
    released liquor from the product cooler scrubber dust stage and released liquor from the granulator scrubber dust stage is sent to the evaporation unit;
    a vapour stream from the evaporation unit, which contains ammonia, is sent into the condenser unit which releases a liquid process condensate, the liquid process condensate being sent into the granulator scrubber acid stage; and
    a concentrated liquor stream from the evaporation unit, containing urea and ammonium salt, and a urea melt from a synthesis unit are separately conveyed into the urea granulator.

2. The process according to claim 1, wherein the concentration of the urea melt and concentrated liquor stream, containing urea and ammonium salt, for the urea granulator is kept in a range from 95 to 99.8% wt.

3. The process according to claim 2, wherein the concentration of the urea melt and concentrated liquor stream, containing urea and ammonium salt, for the urea granulator is kept in a range from 96 to 97.5% wt.

4. The process according to claim 1, wherein the acid of the acid stream is selected from the group consisting of: sulphuric acid, nitric acid, phosphoric acid, citric acid, lactic acid and oxalic acid.

5. The process according to claim 1, wherein the ammonia salt concentration of the liquor stream in the granulator scrubber acid stage included in the first sequence of process steps, is kept <10% wt.

6. The process according to claim 5, wherein the ammonia salt concentration of the liquor stream in the granulator scrubber acid stage included in the first sequence of process steps, is kept in a range from 6-8% wt.

7. The process according to claim 1, wherein the pH of the liquor stream in the granulator scrubber acid stage 3 included in the first sequence of process steps, is kept in a range from 2-6.

8. The process according to claim 7, wherein the pH of the liquor stream in the granulator scrubber acid stage included in the first sequence of process steps is kept in a range from 3.5-5.0.

9. The process according to claim 8, wherein the pH of the liquor stream in the granulator scrubber acid stage included in the first sequence of process steps is kept in a range from 4.0-4.5.

10. The process according to claim 1, wherein the urea concentration of the liquor in the granulator scrubber dust stage 2 is kept in a range from 35 to 60% wt.

11. The process according to claim 10, wherein the urea concentration of the liquor in the granulator scrubber dust stage 2 is kept in a range from 45 to 55% wt.

12. The process according to claim 1, wherein the concentration of the ammonium salt at the outlet of the evaporation unit is kept below 12% wt.

13. The process according to claim 12, wherein the concentration of the ammonium salt at the outlet of the evaporation unit is kept in a range from 9-11% wt.

14. The process according to claim 1, wherein the mixture fed into the evaporation unit is mixed with a portion of the urea melt.

15. The process according to claim 1, wherein the mixture of clean off-gases released into the atmosphere exhibits a concentration of NH3 in the range of 10-25 mg/Nm3.

16. The process according to claim 1, wherein the mixture of clean off-gases released into the atmosphere exhibits a concentration of NH3<15 mg/Nm3.

17. An apparatus for urea granulation with a scrubbing system including several waste streams for the removal of dust and ammonia from the off-gas of a urea granulator suitable for operating a process according to claim 1, comprising:
   an urea granulator;
   a granulator scrubber dust stage and a granulator scrubber acid stage 3 forming a first sequence of apparatuses;
   product coolers and a product cooler scrubber dust stage forming a second sequence of apparatuses;
   an evaporation unit;
   a condenser unit;
   means for providing the urea granulator with fresh air;
   means for drawing off dust- and ammonia-laden air from the urea granulator and for conveying it into the granulator scrubber dust stage;
   means for drawing off air from the granulator scrubber dust stage into the granulator scrubber acid stage;
   means for providing the product coolers with fresh air;
   means for conveying used air from the product coolers to the product cooler scrubber dust stage;
   means for releasing cleaned air from the product cooler scrubber dust stage and cleaned air from the granulator scrubber acid stage, included in the first sequence of apparatuses, into the atmosphere;
   means for conveying process water and acid to the granulator scrubber acid stage;
   means for conveying process water to the granulator scrubber dust stage; and
   means for conveying urea granules from the urea granulator to the product coolers; wherein
   apparatuses of the scrubbing system are connected in such a way that a complete closed system of waste streams is formed, comprising:
   means for conveying a liquor stream from the granulator scrubber acid stage to the product cooler scrubber dust stage;
   means for conveying a liquor stream from the product cooler scrubber dust stage and a liquor stream from the granulator scrubber dust stage to the evaporation unit;
   means for conveying steam vapour of the evaporation unit to a condenser unit;
   means for conveying process condensate from the condenser unit to the granulator scrubber acid stage; and
   means for conveying urea melt and a means for conveying a concentrated liquor stream containing urea and ammonium salt, separately from each other into the urea granulator.

18. The apparatus according to claim 17, comprising:
   means for mixing the liquor stream from the product cooler scrubber dust stage with the liquor stream from the granulator scrubber dust stage 2;
   means of feeding urea melt to that mixture; and
   means for feeding that mixture into the evaporation unit.

19. The apparatus according to any of claim 17, comprising means for conveying a portion of urea melt to the evaporation unit.

* * * * *